US012443356B2

(12) United States Patent
Turner et al.

(10) Patent No.: US 12,443,356 B2
(45) Date of Patent: Oct. 14, 2025

(54) OPTICAL COMPUTING WITH DISAGGREGATED MEMORY

(71) Applicant: Lightmatter, Inc., Boston, MA (US)

(72) Inventors: Robert Turner, Georgetown, TX (US); Darius Bunandar, Boston, MA (US)

(73) Assignee: Lightmatter, Inc., Boston, MA (US)

( * ) Notice: Subject to any disclaimer, the term of this patent is extended or adjusted under 35 U.S.C. 154(b) by 0 days.

(21) Appl. No.: 18/793,079

(22) Filed: Aug. 2, 2024

(65) Prior Publication Data

US 2025/0044969 A1 Feb. 6, 2025

Related U.S. Application Data

(60) Provisional application No. 63/517,583, filed on Aug. 3, 2023.

(51) Int. Cl.
*G06F 3/00* (2006.01)
*G06F 3/06* (2006.01)

(52) U.S. Cl.
CPC ............ *G06F 3/064* (2013.01); *G06F 3/0604* (2013.01); *G06F 3/0673* (2013.01)

(58) Field of Classification Search
None
See application file for complete search history.

(56) References Cited

U.S. PATENT DOCUMENTS

| | | |
|---|---|---|
| 11,860,413 B2 | 1/2024 | Harris et al. |
| 2012/0033978 A1 | 2/2012 | Morris et al. |
| 2021/0258078 A1 | 8/2021 | Meade et al. |
| 2024/0045464 A1 * | 2/2024 | Turner .................. G11C 5/04 |

OTHER PUBLICATIONS

Mishra et al., MONet: heterogeneous Memory over Optical Network for large-scale data center resource disaggregation. Journal of Optical Communications and Networking. IEEE. May 1, 2021;13(5):126-39. DOI: 10.1364/JOCN.419145.

* cited by examiner

*Primary Examiner* — Midys Rojas
(74) *Attorney, Agent, or Firm* — Wolf, Greenfield & Sacks, P.C.

(57) ABSTRACT

Described herein are embodiments of a photonic computing system comprising one or more processors in communication with disaggregated memory through one or more optical channels. The disaggregated memory comprises multiple memory units placed on a photonic substrate that includes a photonic network that can be programmed to configure which of the memory units can be accessed by each of the processor(s). The disaggregated memory includes a memory controller for reading and writing data to/from the memory units. The memory controller may be configured to perform processing in concert with the processor(s).

20 Claims, 12 Drawing Sheets

OPTICAL COMPUTING WITH DISAGGREGATED MEMORY

RELATED APPLICATIONS

This application claims the benefit under 35 U.S.C. § 119 (e) of U.S. Provisional Patent Application No. 63/517,583 filed on Aug. 3, 2023, entitled "PROCESSING TECHNIQUES FOR OPTICAL COMPUTING SYSTEM WITH DISAGGREGATED MEMORY", which is incorporated by reference herein in its entirety.

FIELD

Aspects of the present disclosure relate to an optical computing system comprising one or more processors in communication with one or more disaggregated memory blocks. Each of the disaggregated memory block(s) may comprise multiple memory units interconnected through a photonic network.

BACKGROUND

A memory unit may be a chip comprising of an integrated circuit that can store data. A memory unit may include random access memory (RAM) or read only memory (ROM). For example, a memory unit may be a dynamic RAM (DRAM) chip, a static RAM (SRAM) chip, a programmable ROM (PROM) chip, or erasable PROM (EPROM). A processor may use memory units to store information. For example, a processor may use a RAM chip to temporarily store information (e.g., software application program instructions and/or data). As another example, a ROM chip may store firmware for operating a device.

SUMMARY

Described herein are embodiments of a photonic computing system comprising one or more processors in communication with disaggregated memory through one or more optical channels. The disaggregated memory comprises multiple memory units placed on a photonic substrate that includes a photonic network that can be programmed to configure which of the memory units can be accessed by each of the processor(s). The disaggregated memory includes a memory controller for reading and writing data to/from the memory units. The memory controller may be configured to perform processing in concert with the processor(s).

Some embodiments provide a photonic computing system. The photonic computing system comprises: a first processor; an optical channel; and a photonic substrate separate from the first processor, the photonic substrate comprising: a plurality of memory units storing data; a memory controller; and a photonic network for providing access to the plurality of memory units through the optical channel; wherein: the photonic network is programmable to configure which of the plurality of memory units the first processor can access through the optical channel; the first processor is configured to perform a first set of one or more operations using data from the plurality of memory units; and the memory controller is configured to perform a second set of one or more operations using data from the plurality of memory units.

In some embodiments, the first set of one or more operations includes at least one operation that is not included in the second set of one or more operations. In some embodiments, none of the first set of one or more operations are included in the second set of one or more operations. In some embodiments, performing the first set of one or more operations by the first processor is in parallel with performance of the second set of one or more operations by the memory controller.

In some embodiments, performing the second set of one or more operations by the memory controller is subsequent to performance of the first set of one or more operations by the first processor. In some embodiments, performing the second set of one or more operations by the memory controller comprises using a result of the first set of one or more operations stored in the plurality of memory units to perform the second set of one or more operations.

In some embodiments, the photonic computing system further comprises: a second processor configured to perform a third set of one or more operations using data from the plurality of memory units, wherein execution of the third set of one or more operations by the second processor is in parallel with execution of the first set of one or more operations by the first processor.

In some embodiments, performing the second set of one or more operations by the memory controller comprises: accessing data stored in a first one of the plurality of memory units by the first processor; and performing the second set of one or more operations using the data accessed from the first memory unit.

In some embodiments, the first set of one or more operations is more computationally complex than the second set of one or more operations. In some embodiments, the second set of one or more operations comprises computing an average of values stored in the plurality of memory units. In some embodiments, the second set of one or more operations comprises a gather, scatter, and/or reduce operation.

Some embodiments provide a method performed using a photonic computing system comprising a first processor, a photonic substrate separate from the first processor, the photonic substrate comprising a plurality of memory units, a memory controller, and a photonic network for providing access to the plurality of memory units. The method comprises: programming the photonic network to provide the first processor with access to one or more of the plurality of memory units; performing, using the first processor, a first set of one or more operations using data from the plurality of memory units; and performing, using the memory controller, a second set of one or more operations using data from the plurality of memory units.

In some embodiments, the first set of one or more operations includes at least one operation that is not included in the second set of one or more operations. In some embodiments, performing the first set of one or more operations by the first processor is in parallel with performance of the second set of one or more operations by the memory controller. In some embodiments, performing the second set of one or more operations by the memory controller is subsequent to performance of the first set of one or more operations by the first processor. In some embodiments, performing the second set of one or more operations by the memory controller comprises using a result of the first set of one or more operations stored in the plurality of memory units to perform the second set of one or more operations. In some embodiments, performing the second set of one or more operations by the memory controller comprises: accessing data stored in a first one of the plurality of memory units by the first processor; and performing the second set of one or more operations using the data accessed from the first memory unit.

In some embodiments, the first set of one or more operations is more computationally complex than the second set of one or more operations.

Some embodiments provide a non-transitory computer-readable storage medium storing instructions. The instructions, when executed using a photonic computing system comprising a first processor, a photonic substrate separate from the first processor, the photonic substrate comprising a plurality of memory units, a memory controller, and a photonic network for providing access to the plurality of memory units, causes the photonic computing system to perform a method. The method comprises: programming the photonic network to provide the first processor with access to one or more of the plurality of memory units; performing, using the first processor, a first set of one or more operations using data from the plurality of memory units; and performing, using the memory controller, a second set of one or more operations using data from the plurality of memory units.

The foregoing is a non-limiting summary.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

DETAILED DESCRIPTION

Figure 1A:
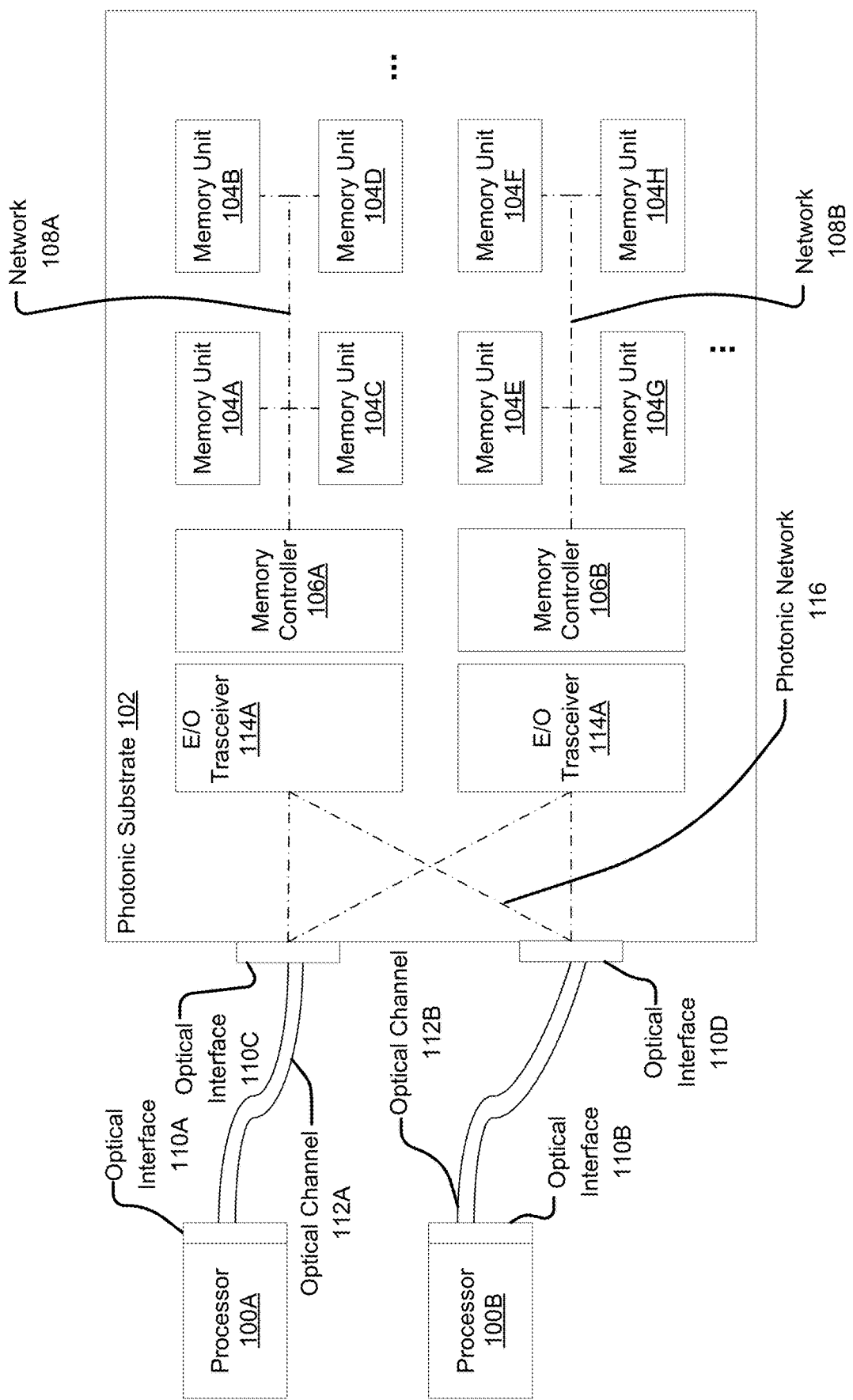
FIG. 1A is an example photonic computing system, according to some embodiments of the technology described herein.

Described herein are embodiments of a photonic computing system comprising one or more processors in communication with disaggregated memory through one or more optical channels. The disaggregated memory comprises multiple memory units and a memory controller. Operations in the photonic computing system may be performed by the processor(s) that are disaggregated from the memory and the memory controller.

Disaggregating memory from a processor that may access the memory through an optical channel (e.g., optical fiber(s)) increases the capacity of memory available to the processor without requiring the processor to be integrated with the memory on a chip and without negatively affecting memory bandwidth and latency. The disaggregated memory may be accessed through a memory controller (also known as a memory chip controller (MCC) or a memory controller unit (MCU)) configured to manage flow of data to and from the memory. For example, the memory controller may be configured to read and write data from the memory. The memory controller may be less sophisticated than the processor. For example, the memory controller may have a larger node (e.g., a larger complementary metal-oxide semiconductor (CMOS) node) than the processor(s). Thus, the memory controller has less processing capacity than the processor.

Certain operations of lower complexity (e.g., arithmetic operations, averaging, gather, and/or other operations) require lower processing capacity. Some important lower complexity operations include distributed or collective operations which rely on reducing the number of copying operations to reduce the latency of operations. The inventors recognized that such operations may be performed by a memory controller that is integrated with the disaggregated memory (e.g., on a photonic substrate). This allows a photonic computing system to perform certain operations without the latency associated with transmitting data to and from the processor(s) disaggregated from the memory. The memory controller has direct access to memory units (e.g., through electrical and/or optical connections on a photonic substrate). The memory controller may access data from the memory units and perform certain operations. By offloading operations to the memory controller, the photonic computing system may perform operations more efficiently (e.g., by eliminating latency associated with transmitting data to and from the processor(s)). Additionally, in some embodiments that use memory units capable of in-memory computing, these lower complexity arithmetic operations can be performed within the memory units themselves.

Some embodiments provide a photonic computing system. The photonic computing system comprises: a first processor; an optical channel; and a photonic substrate separate from the first processor. The photonic substrate comprises: a plurality of memory units storing data; a memory controller; and a photonic network for providing access to the plurality of memory units through the optical channel. The photonic network is programmable to configure which of the plurality of memory units the first processor can access through the optical channel. The first processor is configured to perform a first set of one or more operations using data from the plurality of memory units. The memory controller is configured to perform a second set of one or more operations using data from the plurality of memory units.

In some embodiments, the first set of operation(s) includes at least one operation that is not included in the second set of operation(s). For example, the first set of operation(s) may include a matrix multiplication while the second set of operation(s) may not include a matrix multiplication. In some embodiments, the first set of operation(s) may be more computationally complex than the second set of operations(s). For example, the first set of operation(s) may include matrix multiplication while the second set of operation(s) may include less complex operation(s) such as an averaging operation, a gather operation, a scatter operation, and/or a reduce operation. In some embodiments, none of the first set of operation(s) may be included in the second set of operation(s).

In some embodiments, the first set of operation(s) may be performed by the first processor in parallel with performance of the second set of operation(s) by the memory controller. In some embodiments, the second set of operation(s) may be performed by the memory controller subsequent to performance of the first set of operation(s). For example, the second set of operation(s) may use a result of the first set of operation(s) stored in the plurality of memory units (e.g., by accessing data stored in one or more of the plurality of memory units by the first processor and performing the second set of operation(s) using the data).

The techniques described herein may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the technology described herein are not limited to the use of any particular technique or combination of techniques.

FIG. 1A is an example photonic computing system, according to some embodiments of the technology described herein. The photonic computing system includes processors 100A, 100B, a photonic substrate 102, and sets of one or more optical channels 112A, 112B through which respective processors 100A, 100B are connected to the photonic substrate 102. The processors 100A, 100B may be configured to access memory units 104 placed on the photonic substrate 102 through respective sets of optical channels 112A, 112B.

Each of the processors 100A, 100B may be any suitable processor. In some embodiments, a processor may comprise a central processing unit (CPU) comprising logic circuitry to execute instructions. The CPU may be configured to perform arithmetic, logical, and input/output (I/O) operations. In some embodiments, a processor may comprise a graphics processing unit (GPU). The GPU may be configured to perform graphics processing. For example, the GPU may perform image processing operations. In some embodiments, a processor may comprise a neural processing unit (NPU) configured to perform neural network processing. For example, the NPU may process inputs to a neural network model using weights of the neural network model to determine an output of the neural network model for the inputs. In some embodiments, a processor may comprise an analog processor. For example, an analog processor may be a photonic processor.

In some embodiments, one or more of the processors 100A, 100B may be a multi-core processor. For example, a processor may have 2, 4, 6, 8, 10, or 12 cores. The multi-core processor may be configured to simultaneously process multiple sets of instructions. In some embodiments, each of the processors 100A, 100B may be virtualized processor cores (e.g., vCPUs).

As shown in FIG. 1A, the processors 100A, 100B include respective optical interfaces 110A, 110B through which the processors 100A, 100B may transmit and/or receive data as light transmissions. In some embodiments, each of the optical interfaces 110A, 110B may comprise a fiber attach for connecting to a set of one or more optical fibers. In some embodiments, the optical fiber(s) can be attached vertically through the use of vertical grating couplers and lenses. In some embodiments, the optical fiber(s) can be attached through edge attach using edge couplers, v-grooves, or evanescent couplers. In some embodiments, the optical fiber(s) may be pluggable through the use of a pluggable glass module. The processors 100A, 100B may each transmit and receive light transmissions through a set of optical fiber(s).

The photonic computing system of FIG. 1A includes a photonic substrate 102. The photonic substrate includes memory units 104A, 104B, 104C, 104D, 104E, 104F, 104G, 104H and two memory networks 108A, 108B. A first set of memory units 104A, 104B, 104C, 104D may be accessed through memory network 108A. A second set of memory units 104E, 104F, 104G, 104H may be accessed through photonic memory network 108B. Examples of memory units include HBM, DRAM, non-volatile random access memory (NVRAM), and/or NAND flash. The photonic substrate 102 also includes electrical/optical (E/O) transceivers 114A, 114B, and optical interfaces 110C, 110D. In some embodiments, the photonic substrate 102 includes memory controllers 106A, 106B connected to respective memory networks 108A, 108B. The memory controllers 106A, 106B may be configured to program the respective photonic networks to select one or more memory units for connection to each processor, thereby enabling write and read operations.

It should be noted that instead of having separate photonic networks as shown in FIG. 1A, a common photonic network may be used across all the memory units in some embodiments. A common memory controller may program the common photonic network.

In some embodiments, the each of the memory networks 108A, 108B may comprise a set of electrical connections between a memory controller and a corresponding set of memory units. The memory network 108A may include electrical connections between the memory controller 106A and the memory units 104A, 104B, 104C, 104D. Likewise, the memory network 108B may include electrical connections between the memory controller 106B and the memory units 104E, 104F, 104G, 104H. In some embodiments, each of the memory networks 108A, 108B may be a photonic network. The photonic networks may include multiple photonic modules. Each photonic module may be uniquely associated with a particular memory unit (or a particular subset of the memory units), and may be programmed to enable or disable access to that memory unit or subset. For example, each photonic module may include one more programmable photonic switches configured to connect to, or disconnect from, the corresponding memory unit or subset of memory units. In some embodiments, photonic modules forming the photonic substrate 102 may be manufactured using microfabrication techniques (e.g., complementary metal-oxide-semiconductor (CMOS) microfabrication techniques). For example, the photonic modules may be patterned as multiple copies of a template photonic module using step and repeat lithography-based fabrication techniques. A detailed description of the photonic modules is provided in U.S. Pat. No. 11,036,002, which is incorporated herein by reference in its entirety.

In some embodiments, each of the memory networks 108A, 108B may be a programmable network. Each of the memory networks 108A, 108B may be programmable to configure which of the memory units 104A-104H is accessible by each of the processors 100A, 100B. For example, the memory network 108A, when programmed into a particular configuration, may provide access to one or more of memory units 104A, 104B, 104C, 104D to the processor 100A and/or access to one or more of memory units 104A, 104B, 104C, 104D to the processor 100B. As another example, the memory network 108B, when programmed into a particular configuration, may provide access to one or more of memory units 104E, 104F, 104G, 104H to the processor 100A and/or access to one or more of memory units 104E, 104F, 104G, 104H to the processor 100B. Thus, each of the memory networks 108A, 108B may be programmed to selectively place the processors 100A, 100B in communication with respective subsets of the memory units 104A-104H.

In some embodiments, a configuration of each of the memory networks 108A, 108B may be dynamic. As such, the memory networks 108A, 108B may be programmed multiple times. For example, the memory networks 108A, 108B may be programmed during execution of instructions to provide the processors 100A, 100B to different ones of the memory units 104A-104H. In some embodiments, the memory networks 108A, 108B may be programmed as part of executing parallelized operations. Example techniques of executing parallelized execution of operations are described herein. In some embodiments, the memory networks 108A, 108B may be programmed to allocate memory to a virtual machine (e.g., a virtual CPU). For example, memory may be allocated to a virtual machine based on the requirements of an application to be executed by the virtual machine.

As illustrated in the example of FIG. 1A, in some embodiments, a memory network may interconnect memory units and a memory controller in a circuit. For example, memory network 108A may include a circuit interconnecting memory units 104A, 104B, 104C, 104D and memory controller 106A. As another example, memory network 108B may include a circuit interconnecting memory units 104E, 104F, 104G, 104H and memory controller 106B. In embodiments in which a network is a photonic network, each memory unit may be connected to the photonic network through a respective E/O transceiver for converting data read and write signals between electrical and optical signals. For example, E/O transceivers may be connected to an optical circuit of a photonic network through which the E/O transceivers may transmit and receive optical signals. Although the example embodiment of FIG. 1A shows a single E/O transceiver associated with a photonic network, in some embodiments, the photonic substrate 102 may include multiple E/O transceivers each associated with a memory unit.

In some embodiments, the photonic network 116 of the photonic computing system may allow any of the processors 100A, 100B to connect to any of the memory controllers 106A, 106B. In some embodiments, the photonic network 116 may comprise of an optical circuit that connects the E/O transceivers 114A, 114B to the optical interfaces 110C, 110D (e.g., fiber attaches). For example, memory controller 106A may be connected to the optical interfaces 110C, 110D through the photonic network 116 and may be connected to memory units 104A, 104B, 104C, 104D through electrical connections. The memory controller 106A may transmit and receive data signals (e.g., read and write signals) to/from the memory units 104A, 104B, 104C, 104D through the electrical connections. In such embodiments, an E/O transceiver may convert data signals to/from the memory controller between electrical and optical signals. For example, E/O transceiver 114A may convert data signals to/from memory controller 106A between electrical and optical signals.

In some embodiments, the photonic network 116 comprises one or more photonic switches. The photonic network 116 may be programmed by configuring the one or more photonic switches of the photonic network. Examples of optical switches that may be included in each of the photonic network 116 include Mach-Zehnder interferometers, optical resonators, multi-mode interference (MMI) waveguides, arrayed waveguide gratings (AWG), thermos-optic switches, acousto-optic switches, magneto-optic switches, micro-electromechanical switches (MEMS) optical switches, non-linear optical switches, liquid crystal switches, piezoelectric beam steering switches, grating switches, dispersive switches, and/or other suitable optical switches. In some embodiments, the one or more optical switches of the photonic network 116 may be implemented in an optical circuit. The one or more optical switches may be configured to control the routes in the optical circuit. In some embodiments, the one or more optical switches may be integrated into the photonic substrate 102.

In embodiments in which the photonic substrate 102 includes memory controllers 106A, 106B, the photonic network 116 may be programmed by respective memory controllers 106A, 106B. In some embodiments, each of the memory controllers 106A, 106B may be configured to program the photonic network 116 by configuring one or more switches of the photonic network 116. The memory controller 106A may be connected to an optical circuit including optical switches that can be controlled by the memory controller 106A. The memory controller 106A may configure the optical switches in the optical circuit to control which of the memory controllers 106A, 106B can be accessed through the optical circuit by the processors 100A, 100B. The memory controller 106B may be connected to an optical circuit including optical switches that can be controlled by the memory controller 106B. The memory controller 106A may configure the optical switches in the optical circuit to control which of the memory controllers 106A, 106B can be accessed through the optical circuit by the processors 100A, 100B.

In some embodiments, the photonic network 116 may be programmed by the processors 100A, 100B. In some embodiments, the photonic network 116 may be programmed by the processors 100A, 100B simultaneously. Optical switches of the photonic network 116 may be configured by the processors 100A, 100B to program the photonic network 116. Although not illustrated in the example of FIG. 1A, in some embodiments, the photonic network 116 may be programmed by a separate host. For example, the host may be a CPU. For example, the CPU may access to a configuration of a portion or of all the photonic networks in the photonic substrate 102.

Figure 1B:
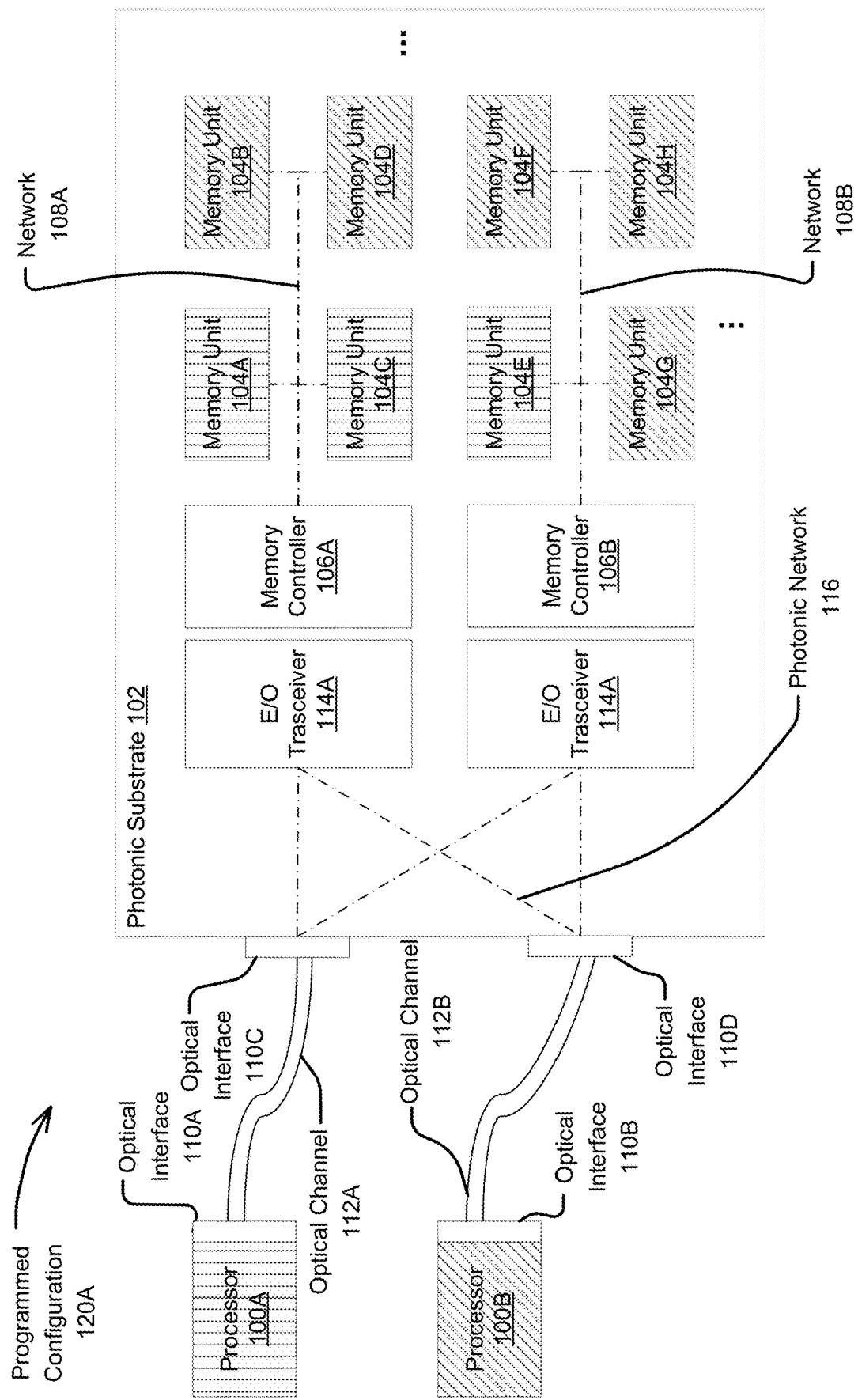
FIG. 1B is a first programmed configuration of the photonic computing system of FIG. 1A, according to some embodiments of the technology described herein.

FIG. 1B is a first programmed configuration 120A of the photonic computing system, according to some embodiments of the technology described herein. For example, the configuration 120A of FIG. 1B may be for executing one or more instructions by each of the processors 100A, 100B. In the first programmed configuration 120A, photonic network 116 and memory network 108A are programmed to provide the processor 100A access to memory units 140A, 140C and to provide the processor 100B access to memory units 104B, 104D. The photonic network 116 and memory network 108B are programmed to provide the processor 100A access to memory unit 104E and to provide the processor 100B access to memory units 104F, 104G, 104H. As illustrated in FIG. 1B, the processor 104A and all the memory units that it has access to in the configuration 120A are shaded with horizontal lines. The processor 100B and all the memory units that it has access to in the configuration 120A are shaded with diagonal lines.

Figure 1C:
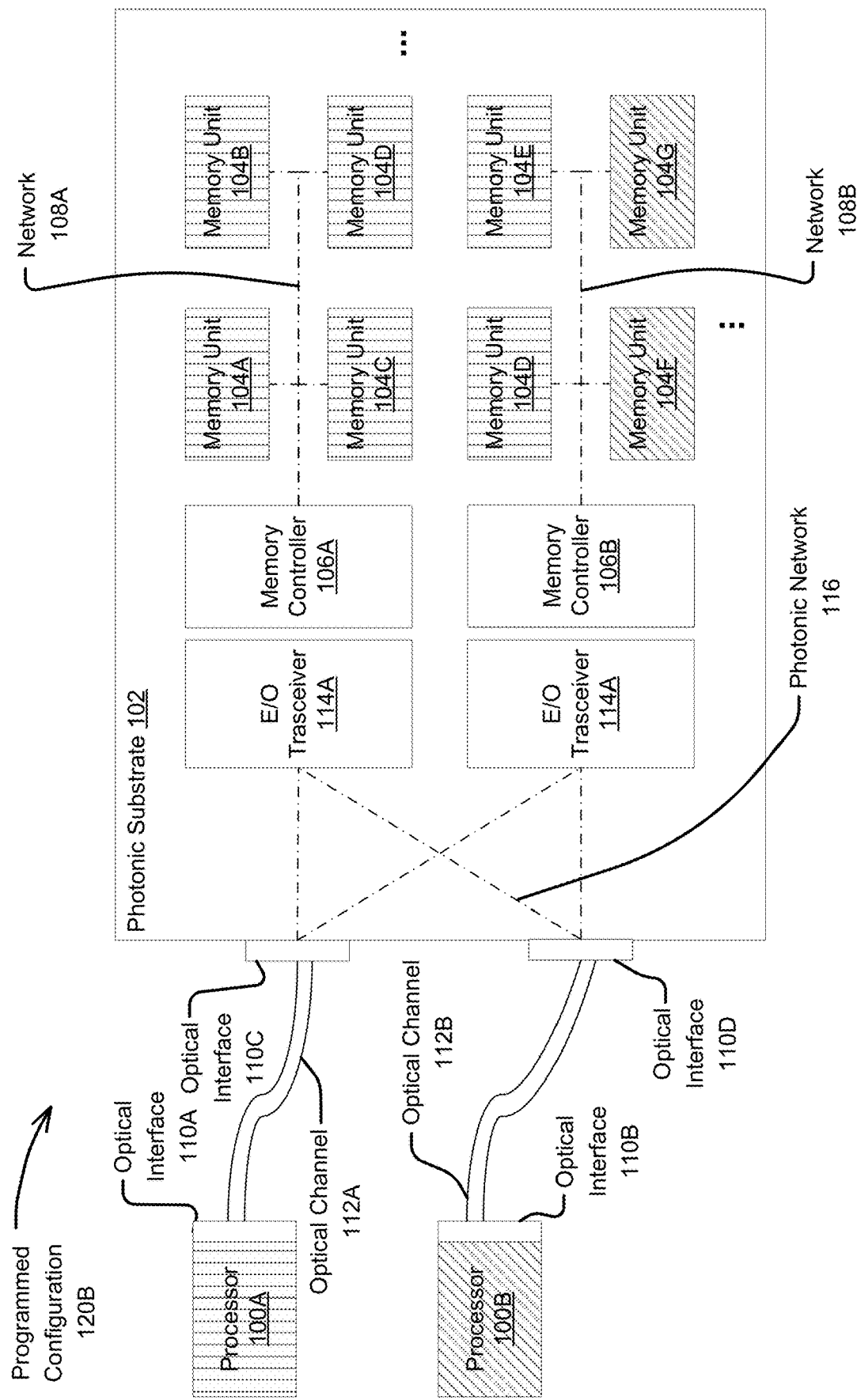
FIG. 1C is a second programmed configuration of the photonic computing system of FIG. 1A, according to some embodiments of the technology described herein.

FIG. 1C is a second programmed configuration 120B of the photonic computing system, according to some embodiments of the technology described herein. For example, the configuration 120B of FIG. 1C may be for executing one or more instructions by each of the processors 100A, 100B subsequent to the configuration 120A of FIG. 1B. In the second programmed configuration 120B, the photonic network 116 and the memory network 108A are programmed to provide the processor 100A access to 104A, 104B, 104C, 104D. Photonic network 108116 and the memory network 108B are programmed to provide the processor 100A access to memory units 104D, 104E and provide the processor 100B access to memory units 104F, 104G.

In some embodiments, each of the E/O transceivers 114A, 114B may include an electrical-to-optical converter such as an optical modulator, and an optical-to-electrical converter such as an optical receiver. The electrical-to-optical converter may be configured to convert electrical data signals generated from reading memory units (e.g., by a memory controller) into optical signals that can be transmitted through an optical channel to a processor. The optical-to-electrical converter may be configured to convert optical signals received through an optical channel from a processor to electrical data signals for storing data in memory units (e.g., by a memory controller). In some embodiments, an E/O transceiver may contain a shim that converts one electronic protocol to another electronic protocol. For example, the shim may convert the signals/protocols used between a memory controller and a processor to one or more SerDes signals. These SerDes signals may then drive photonic transmission (TX) components within a large photonic interposer. The conversion may simply be a direct analog signal conversion or a more sophisticated data conversion in the digital domain. For example, HBM3 has a bandwidth of 9.2 Gb/s per pin, but optical links may operate at higher speeds (50-100 Gb/s per signal). Therefore, multiple HBM3 pin signals may be serialized into a single optical signal which can then be deserialized at the receiver side.

In some embodiments, each of the optical interfaces 110A, 110B may provide an interface for respective optical channels 112A, 112B. In some embodiments, the optical channels 112A, 112B each comprise a set of one or more optical fibers. The optical interfaces 110A, 110B may each comprise a fiber attach may include one or more ports through which a set of optical fiber(s) can connect to an E/O transceiver. A fiber attach may include a fiber coupler (e.g., an out-of-plane coupler or an edge coupler) that can be coupled to the optical channel. The fiber coupler may allow a memory controller to communicate with a processor through the optical channel.

In some embodiments, each of the memory controllers 106A, 106B may comprise a digital circuit for controlling input and output of data from memory units. In some embodiments, each of the memory controllers 106A, 106B may be configured to control access to respective sets of memory units (e.g., for on-chip SRAM memory units). For example, memory controller 106A may read data from memory units 104A, 104B, 104C, 104D requested by processors 100A, 100B, and write data transmitted from the processors 100A, 100B into memory units 104A, 104B, 104C, 104D. In some embodiments, the memory controllers 106A, 106B may be integrated memory controllers that are integrated with respective sets of memory units on a chip. In some embodiments, the memory controllers 106A, 106B may be separate from the memory units 104A-104H (e.g., for DRAM, NVRAM, and flash memory units). Further, in some embodiments, the memory controller 106A, 106B may be manufactured monolithically with the photonic substrate 102, the E/O transceivers 114A, 114B, the memory networks 108A, 108B, and the memory units 104A-H.

In some embodiments, each of the memory controllers 106A, 106B may be configured to perform operations using data stored in respective sets of memory units 104A-D, 104E-H. Memory controller 106A may be configured to perform operations using data from memory units 104A-104D and memory controller 106B may be configured to perform operations using data from memory units 104E-104H. In some embodiments, the memory controllers 106A, 106B may be configured to perform operations of lower computational complexity than operations that the processors 100A, 100B are configured to perform. For example, a memory controller may be configured to perform arithmetic operations, averaging, gather, scatter, and/or reduce operation. As another example, memory controller may be configured to perform message passing interface (MPI) routines (e.g., for distributed and parallel computing). In some embodiments, the memory controllers 106A, 106B may be configured to perform operations using integer values and/or floating point values.

In some embodiments, a memory controller may be configured to perform operations by: (1) accessing data from one or more memory units (e.g., through a photonic network); and (2) performing one or more operations using the data accessed from the memory unit(s). A memory controller may access data from a memory unit by transmitting read data signals through a photonic network to the memory unit. A memory controller may further store data in memory unit(s) (e.g., by transmitting write data signals to the memory unit(s). For example, the memory controller may store a result of operations performed by the memory controller in memory unit(s).

In some embodiments, a memory controller may be configured to perform operations in parallel with a processor. For example, memory controller 106A may perform operations in parallel with performance of operations by processor 100A. To illustrate, the processor 100A may transmit results of operations to the memory controller 106A, and begin processing other data. While the processor 100A is processing the other data, the memory controller 106A may perform operation(s) using the data received from the processor 100A. For example, the memory controller 100A may compute an average, perform a gather operation, perform a reduce operation, or perform another operation using the data.

In some embodiments, each of the memory controllers 106A, 106B may be configured to manage allocation of memory units to the processors 100A, 100B. For example, the memory controller may be configured to allocate memory to a processor 100A based on a process (e.g., a software application) being executed by the processor. The memory controller may be configured to determine the memory resources required for the process and allocate memory units to the processor 100A accordingly. In some embodiments, the memory controllers 106A, 106B may be configured to determine an allocation of memory units to the processors 100A, 100B based on a parallel programming model being used by a process. The memory controllers 106A, 106B may allocate memory units to the processors 100A, 100B according to the parallel programming model to enable parallelized execution of a process. The memory controllers 106A, 106B may be configured to program respective networks 108A, 108B based on determined memory allocations.

As shown in the example of FIG. 1A, in some embodiments, the processors 100A, 100B access the memory units 104A-104H through respective optical channels 112A, 112B. In some embodiments, an optical channel may provide a path for transmission of light. In some embodiments, an optical channel may comprise one or more optical fibers. For example, each of the optical fiber(s) may be a strand of glass, plastic, or other suitable material that transmits light. Multiple such strands may be bundled into a set of optical fibers (e.g., into an optical fiber cable). In some embodiments, an optical channel may transmit data at a rate of at least 1-5, 5-10, 10-15, 15-20, 20-25, or 25-30 terabytes per second (TB/s). For example, an optical channel may transmit data between a processor and a photonic network at a rate of at least 15 TB/s. In some embodiments, each optical channel can carry one or more optical signals, for example through the use of wavelength division multiplexing or polarization multiplexing schemes.

In some embodiments, error correction may be used to allow for higher bandwidth photonic communication. Error correction may be performed on data transmissions to and/or from the memory units through photonic networks. For example, error correction code (ECC) may be used to perform error correction. In some embodiments, a memory controller may be configured to perform error correction on data transmissions to and/or from memory units. In some embodiments, processors 100A, 100B may be configured to perform error correction on data received from memory units. The use of error correction may allow for higher bandwidth photonic communication at the expense of increased latency for performance of the error correction.

Figure 2A:
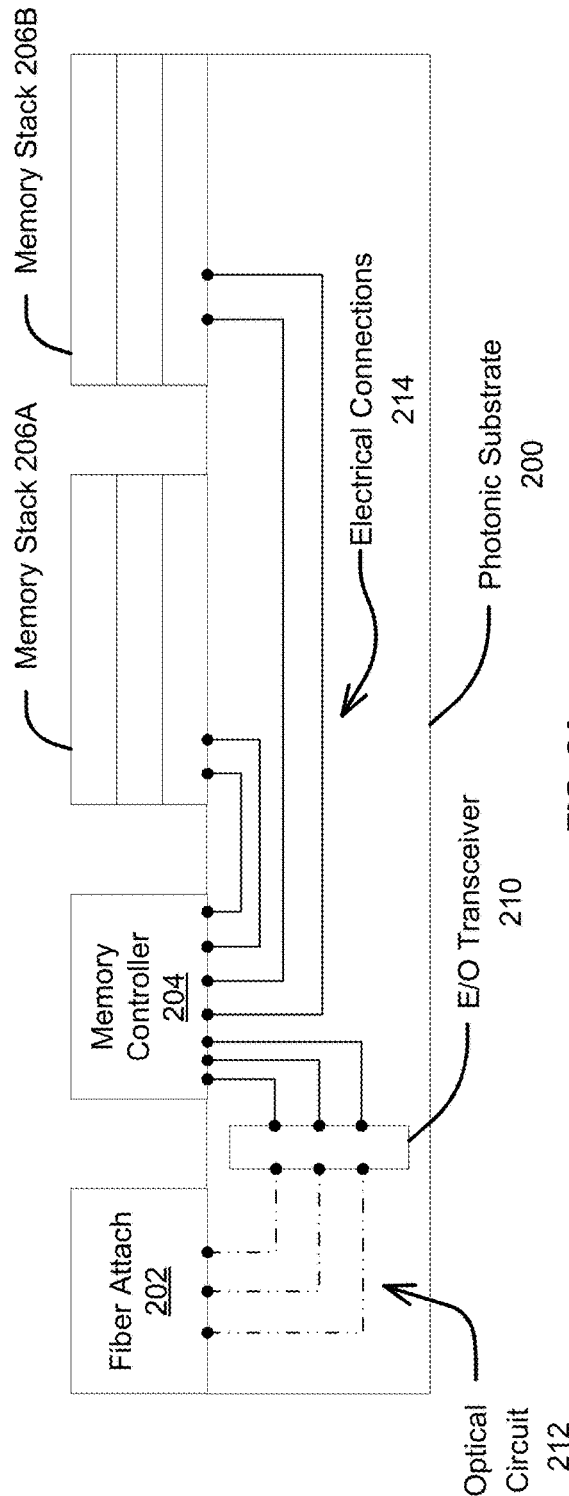
FIG. 2A is a side view of a photonic substrate, according to some embodiments of the technology described herein.
Figure 2B:
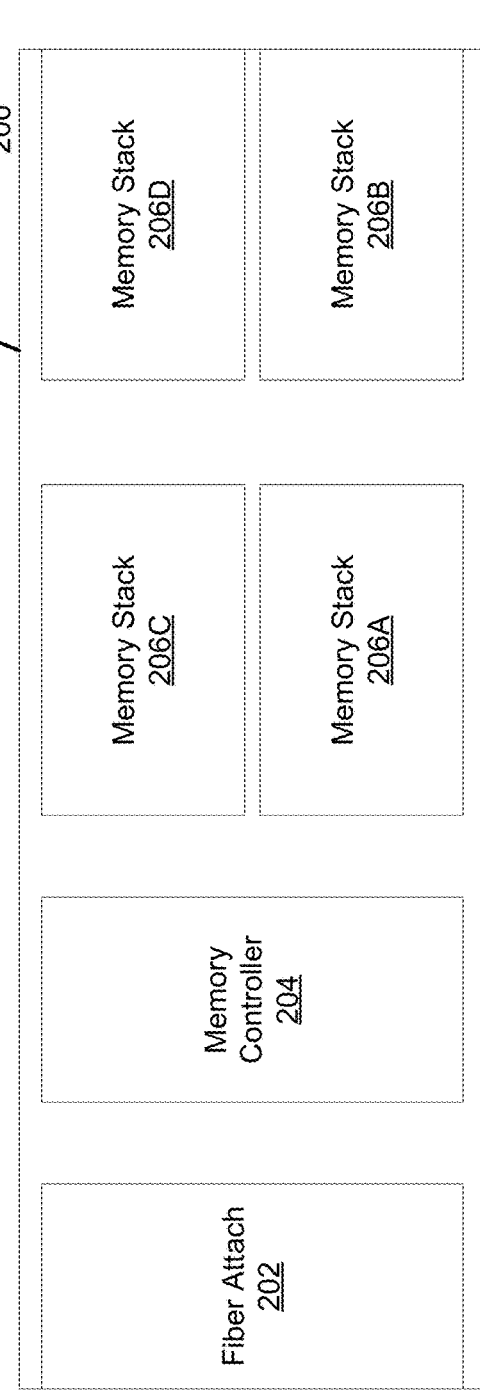
FIG. 2B is an aerial view of the photonic substrate of FIG. 2A, according to some embodiments of the technology described herein.

FIG. 2A is a side view of a photonic substrate 200, according to some embodiments of the technology described herein. FIG. 2B is an aerial view of the photonic substrate 200. As shown in FIG. 2B, the photonic substrate 200 includes a memory controller 204, memory stack 206A, memory stack 206B, memory stack 206C, and memory stack 206D. For example, the photonic substrate 200 shown in FIG. 2A may be a portion of the photonic substrate 102 described herein with reference to FIGS. 1A-1C. The memory stack 206A, 206B, 206C, 206D may be memory units 104A, 104B, 104C, 104D of FIGS. 1A-1C.

As shown in FIG. 2A, a fiber attach 202, E/O transceiver 210, memory controller 204, memory stack 206A, and memory stack are placed on the photonic substrate 200. The photonic substrate 200 further includes an integrated optical circuit 212 which may form a photonic network (e.g., photonic network 116). The optical circuit 212 may include integrated optical switches that can be configured to program the photonic network. As shown in FIG. 2A, the optical circuit 212 connects the fiber attach 202 to the E/O transceiver 210. Accordingly, optical signals may be transmitted to and from the E/O transceiver 210 through the optical circuit 212.

In some embodiments, the E/O transceiver 210 may include the use of wavelength division multiplexing (WDM) where multiple signals, each at a different wavelength of light, are used to increase the transmission bandwidth in a single optical waveguide or optical fiber. Some embodiments may use dense WDM. In dense WDM, the wavelengths may be spaced apart by 100-200 GHz spacing. Some embodiments may use coarse WDM. In coarse WDM, the wavelengths may be spaced apart by >10 nm. Overall, WDM reduces the number of fibers that need to be attached to the photonic substrate 200.

As shown in FIG. 2A, the photonic substrate includes electrical connections 214 through which electrical signals can be transmitted between the E/O transceiver 210 and the memory controller 204, and between the memory controller 204 and the memory stacks 206A, 206B, 206C, 206D. The electrical connections 214 may be configured to transmit electrical data signals generated from reading and writing to the memory stacks 206A, 206B, 206C, 206D. For example, the electrical connections 214 may be used by the memory controller 204 to obtain electrical data signals from reading data from the memory stacks 206A, 206B, 206C, 206D and to transmit the electrical data signals to the E/O transceiver 210 (e.g., for transmission of corresponding optical signals to a processor separate from the photonic substrate 200). As another example, the electrical connections 214 may be used by the memory controller 204 to obtain electrical data signals from the E/O transceiver 210 corresponding to optical signals transmitted from an external processor, and to transmit the electrical data signals to the memory stacks 206A, 206B, 206C, 206D to write data into memory. In some embodiments, the E/O transceiver 210 may include wavelength multiplexing and demultiplexing capability where a single waveguide or a single fiber can carry multiple signals by using different optical wavelengths. In some embodiments, the E/O transceiver 210 may also include SerDes or gearbox for baud-rate conversions. Typically, the electrical connections 214 support signals at lower baud-rate but with a larger number of channels/wires, while the optical channel created by fiber attach 202 support signals at higher baud-rate but with a smaller number of channels (due to the limitation of fiber size and the number of fibers).

In some embodiments, each of the memory stacks 206A, 206B, 206C, 206D may comprise a stack of dies. For example, each of the memory stacks 206A, 206B, 206C, 206D may be a stack of 3 dies, though other numbers of stacked dies are possible. The stack of dies may be mounted to the photonic substrate 200. In some embodiments, a stack of dies may form a memory unit. In some embodiments, each of the memory stacks 206A, 206B, 206C, 206D may be any suitable type of memory. For example, each memory stack may be HBM, DDR, DDRAM, SRAM, DDR SDRAM, or other suitable type of memory.

In some embodiments, the memory controller 204 may be another die mounted to the photonic substrate 200. As described herein with reference to FIGS. 1A-1C, the optical switches of the optical circuit 212 may be configured to set which of the memory stacks 206A, 206B, 206C, 206D are accessible by external processors. In some embodiments, the optical circuit 212 may be configurable to allow one or more external processors to access a particular memory stack. In some embodiments, the optical circuit 212 may be configurable to allow only one external processor to access a particular memory stack at a time.

Figure 2C:
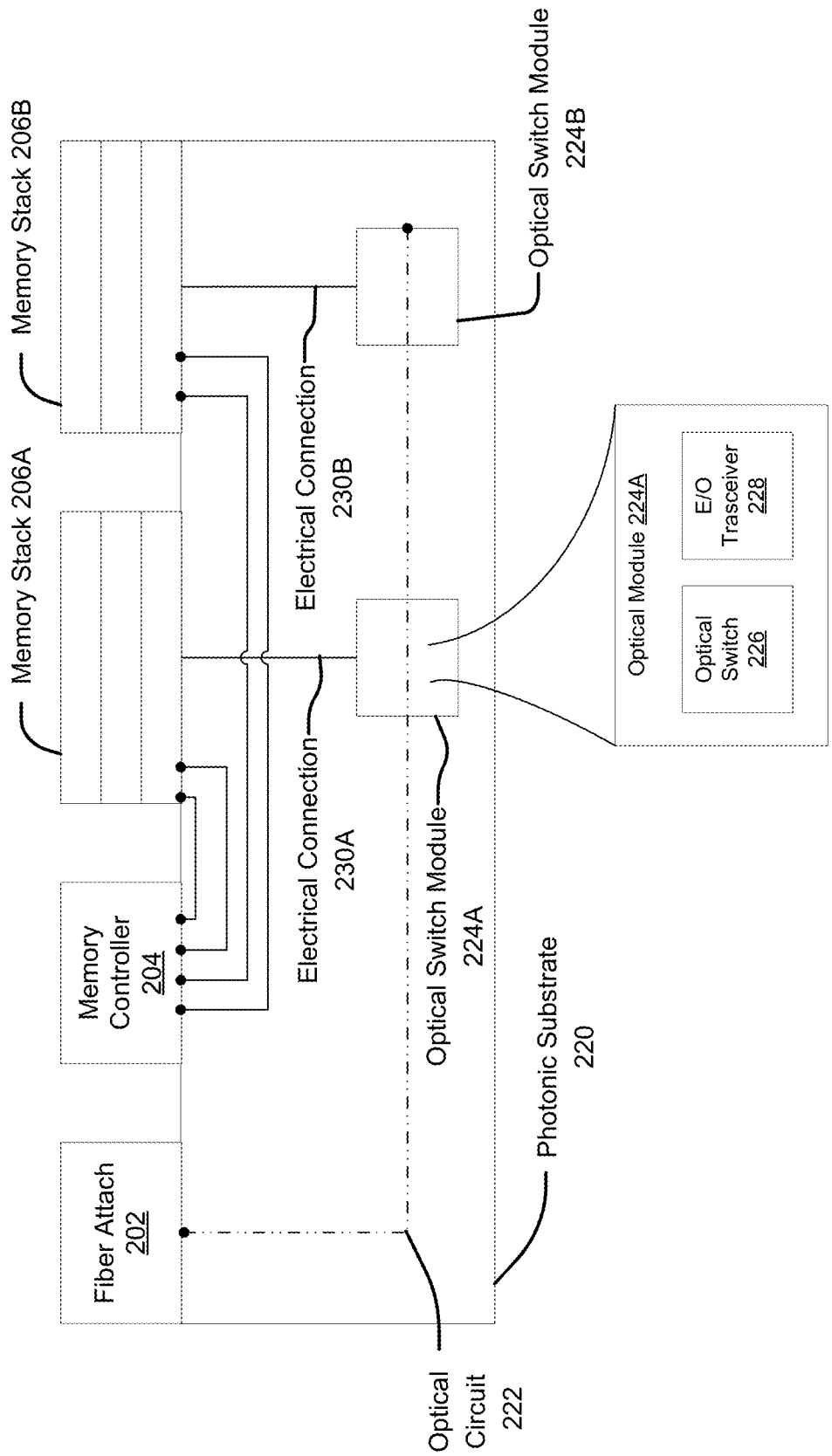
FIG. 2C is a side view of another photonic substrate, according to some embodiments of the technology described herein.

FIG. 2C is a side view of another photonic substrate 220, according to some embodiments of the technology described herein. As shown in FIG. 2C, the photonic substrate 220 includes the memory controller 204, memory stacks 206A, 206B. For example, the photonic substrate 220 shown in FIG. 2C may be a portion of the photonic substrate 102 described herein with reference to FIGS. 1A-IC. The memory stacks 206A, 206B may be memory units 104A, 104B. The photonic substrate 220 may include other memory stacks (e.g., memory stacks 206C, 206D) not shown in FIG. 2C.

In the example embodiment of FIG. 2C, the photonic substrate 220 includes a photonic network comprising optical circuit 222 providing an optical channel for light transmissions to and/or from the memory stacks 206A, 206B. The optical circuit 222 may connect to memory stacks of the photonic substrate 220. The optical circuit 222 includes optical switch modules 224A, 224B that can be configured to control which of the memory stacks 206A, 206B is accessible (e.g., by a processor). The memory controller 204 may be configured to configure program the photonic network by configuring the optical switch modules 224A, 224B. The optical switch modules 224A, 224B are connected to respective memory stacks 206A, 206B through respective electrical connections 230A, 230B. The electrical connections 230A, 230B may, for example, comprise electrically conductive material (e.g., metallic wiring).

FIG. 2C shows example components of an optical module. As shown in the box expanded from optical module 224A, the optical module 224A includes an optical switch 226. Example optical switches are described herein. The optical module 224A further includes an E/O transceiver 228 for conversion between optical and electrical signals. When the optical switch 226 is configured to enable access to the memory stack 206A, the E/O transceiver 228 may be configured to convert optical signals received through the optical circuit 222 (e.g., through the fiber attach) into electrical signals that can be transmitted through the electrical connection 230A. For example, the E/O transceiver 228 may transmit optical data signals in to electrical data signals (e.g., for writing data to the memory stack 206A). The E/O transceiver 228 may further be configured to convert electrical signals received through the electrical connection 230A into optical signals that can be transmitted through the optical circuit 222. For example, the E/O transceiver 228 may convert electrical data signals obtained from reading data from the memory stack 206A into optical data signals that are transmitted through the optical circuit 222.

Figure 2D:
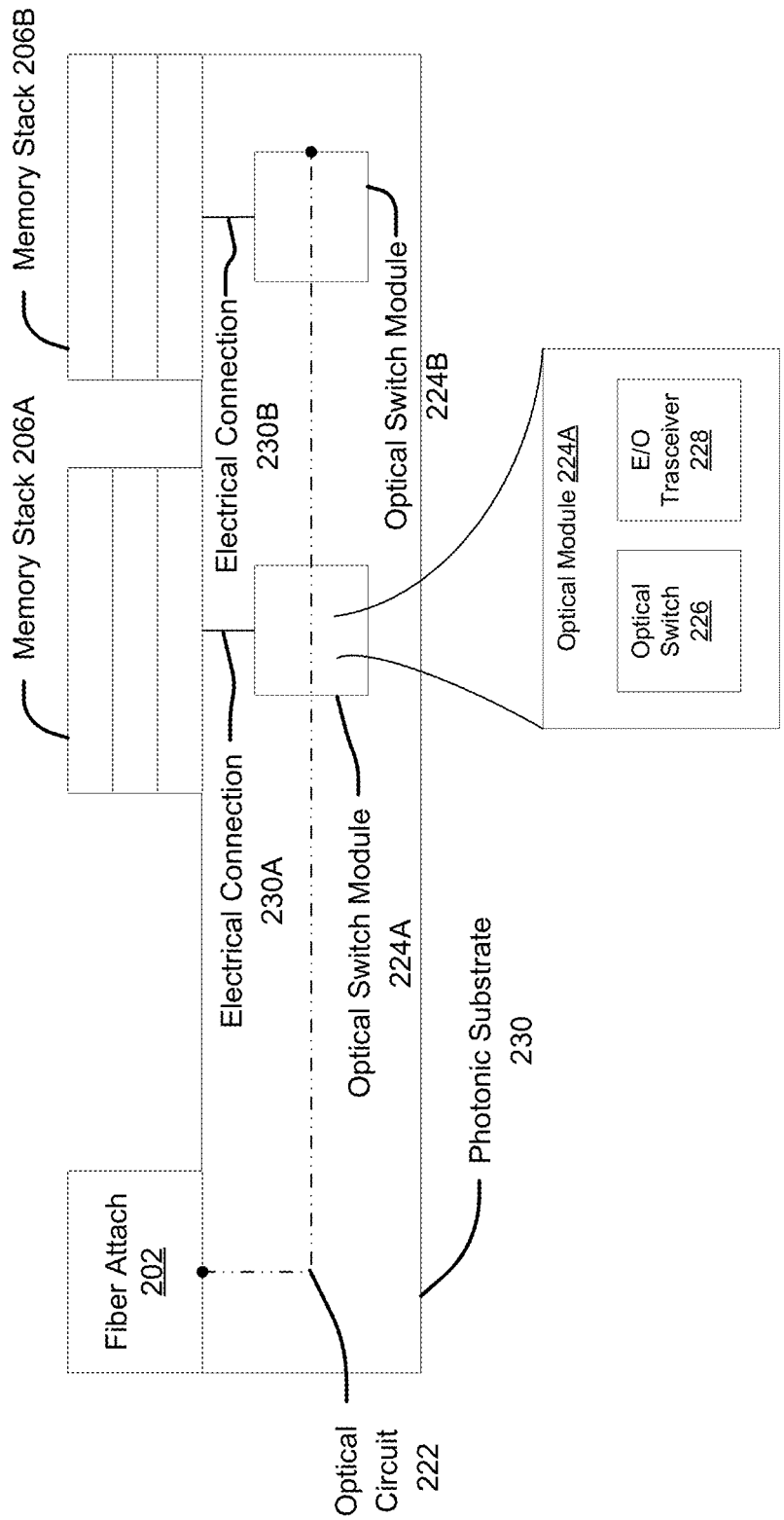
FIG. 2D is a side view of another photonic substrate, according to some embodiments of the technology described herein.

FIG. 2D is a side view of another photonic substrate 230, according to some embodiments of the technology described herein. As shown in FIG. 2D, the photonic substrate 230 includes memory stacks 206A, 206B. For example, the photonic substrate 230 shown in FIG. 2D may be a portion of the photonic substrate 102 described herein with reference to FIGS. 1A-1C. The memory stacks 206A, 206B may be memory units 104A, 104B. The photonic substrate 230 may include other memory stacks (e.g., memory stacks 206C, 206D) not shown in FIG. 2D.

In the example embodiment of FIG. 2D, the photonic substrate 230 includes a photonic network comprising optical circuit 222 providing an optical channel for light transmissions to and/or from the memory stacks 206A, 206B. The optical circuit 222 may connect to memory stacks of the photonic substrate 220. The optical circuit 222 includes optical switch modules 224A, 224B that can be configured to control which of the memory stacks 206A, 206B is accessible (e.g., by a processor). The memory controller 204 may be configured to configure program the photonic network by configuring the optical switch modules 224A, 224B. The optical switch modules 224A, 224B are connected to respective memory stacks 206A, 206B through respective electrical connections 230A, 230B. The electrical connections 230A, 230B may, for example, comprise electrically conductive material (e.g., metallic wiring).

As illustrated in the example embodiment of FIG. 2D, the photonic substrate 230 does not include a memory controller. In such embodiments, the photonic network comprising the optical circuit 222 may be programmed by an external processor (e.g., an external memory controller or other processor connected to the photonic substrate 230). The external processor may program the photonic network by configuring optical switches of the optical switch modules 224A, 224B. The external processor may transmit configuration instructions (e.g., through an optical channel) that are transmitted to the optical switch modules 224A, 224B through the optical circuit 222. For example, the configuration instructions may be included as a prefix and/or suffix of data read and/or write signals.

Figure 3:
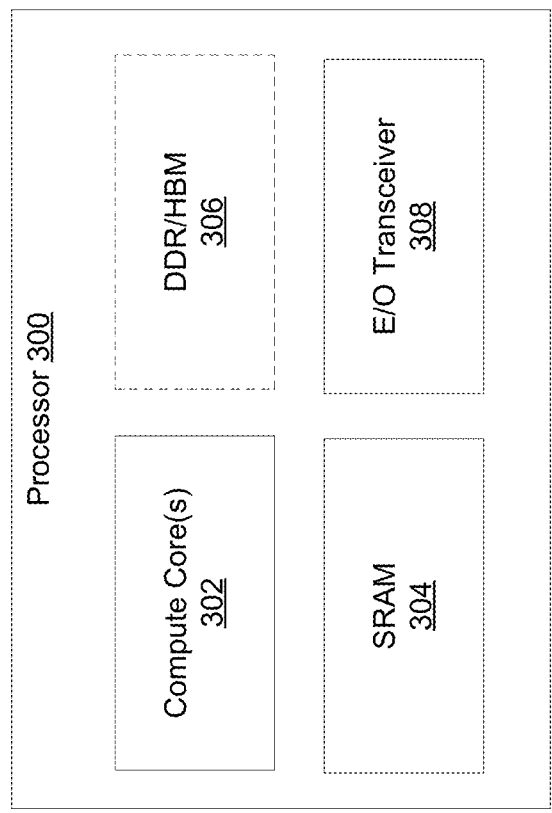
FIG. 3 is an example processor of a photonic computing system, according to some embodiments of the technology described herein.

FIG. 3 is an example processor 300 of a photonic computing system, according to some embodiments of the technology described herein. For example, the processor 300 may be one of the processors 100A, 100B described herein with reference to FIGS. 1A-IC. As shown in FIG. 3, the processor 300 includes one or more compute cores 302, static RAM (SRAM) 304, an E/O transceiver 308, and optional DDR or HBM 306.

In some embodiments, the compute core(s) 302 may include one or more CPUs, GPUs, NPUs, photonic processors, and/or other compute cores. The SRAM 304 may be used by the compute core(s) 302 to execute instructions (e.g., as part of executing a software application program). For example, the SRAM 304 may store instructions and/or data for execution by the compute core(s) 302.

In some embodiments, the processor 300 may include DDR and/or HBM 306. For example, the processor 300 may execute data-intensive applications and thus use DDR and/or HBM 306. For example, the processor 300 may be used to execute an application to train a deep learning model and/or perform inference using the same. Deep learning models often use a large number of parameters (e.g., millions of weights and/or activations) and thus require additional storage capacity for the processor 300. As another example, the processor 300 may be used for graphics processing. Graphics processing may involve processing continuous frames of thousands of pixels and thus require additional storage capacity.

Figure 4:
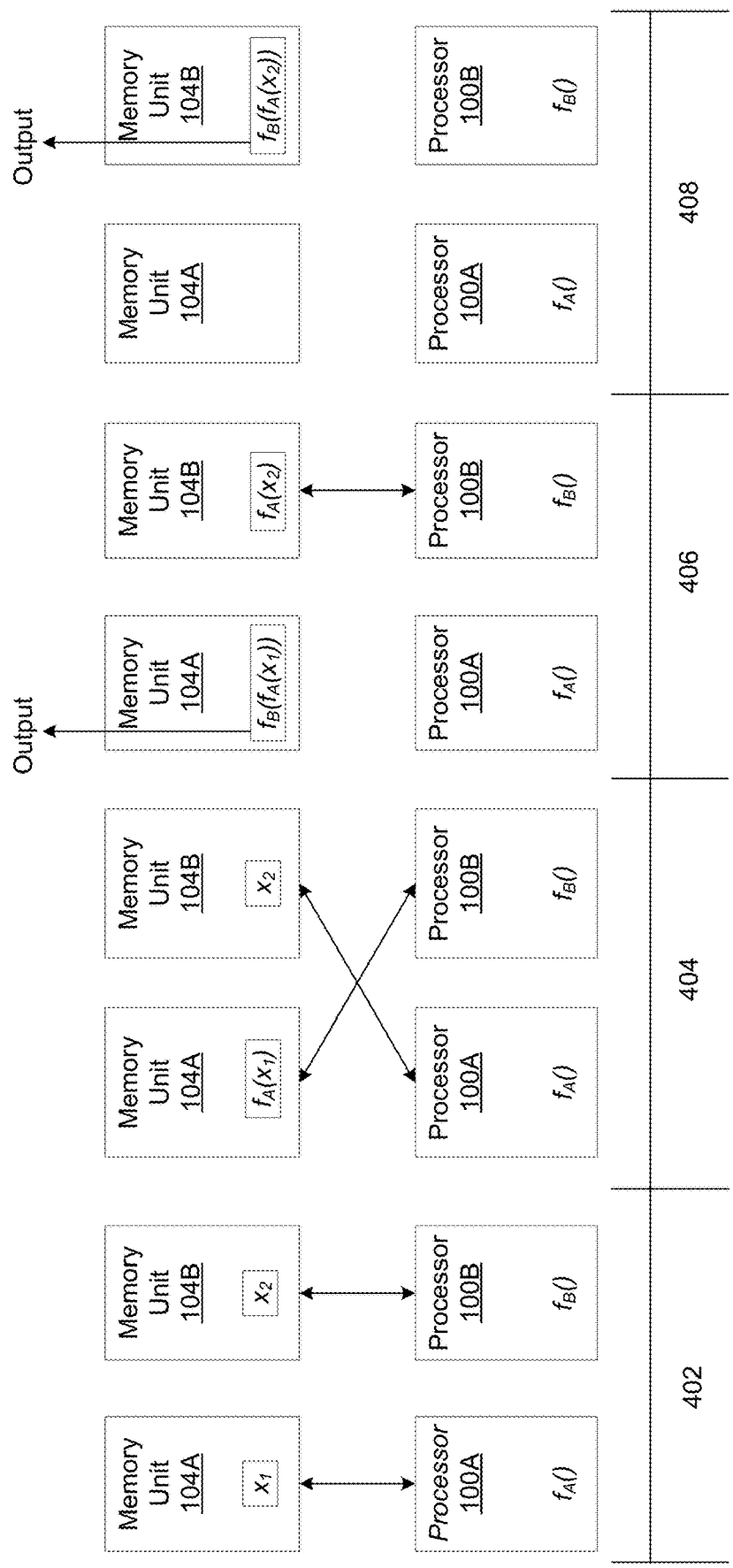
FIG. 4 illustrates an example parallelization paradigm that may be used by some embodiments of the technology described herein.

FIG. 4 illustrates an example parallelization paradigm that may be used by some embodiments of the technology described herein. For example, the parallelization paradigm of FIG. 4 may be used by the photonic computing system described herein with reference to FIGS. 1A-1C. In the example of FIG. 4, the photonic computing system executes the process $f_B(f_A(x_i))$, where $f_A$ is an application to be executed by a first processor (e.g., processor 100A) and $f_B$ is an application to be executed by a second processor (e.g., processor 100B). $x_i$ denotes the i-th data point to be provided as input. Each of the applications $f_A$ and $f_B$ may comprise of one or more operations.

Execution of the process begins at stage 402 by storing input $x_1$ in memory unit 102A and input $x_2$ in memory unit 102B. In some embodiments, the inputs $x_1$ and $x_2$ may be loaded into respective memory units 104A, 104B in parallel. The processor 100A then executes $f_A(x_1)$ and stores the result in memory unit 104A.

Next, at stage 404, the photonic network 116 is programmed to provide the first processor 100A access to the memory unit 104B and to provide the second processor 100B access to the memory unit 104A. The memory network 108A may also be programmed to provide the processor 100A access to the memory unit 104B and to provide the second processor 100B access to the memory unit 104A. The first processor 100A executes $f_A(x_2)$ using the input $x_2$ stored in the memory unit 104B and stores the result in the memory unit 104B. In parallel with execution of the first processor 100A, the second processor 100B executes $f_B(f_A(x_1))$ using the value of $f_A(x_1)$ stored in the memory unit 104A and stores the result in the memory unit 104A.

Next, at stage 406, the result of executing $f_B(f_A(x_1))$ is output from memory unit 104A. The photonic network 116 is programmed to provide the processor 104B access to the memory unit 104B, which currently stores a result of process $f_A(x_2)$ executed in stage 404. The memory network 108A may also be programmed to provide the processor 104B access to the memory unit 104B. The processor 104B executes the process $f_B(f_A(x_2))$ and stores the result in memory unit 104B.

Next, at stage 408, the result of executing the process $f_B(f_A(x_2))$ stored in the memory unit 104B is output from the memory unit 104B. In some embodiments, a subsequent pair of inputs (e.g., $x_3$ and $x_4$) may be loaded into the memory units 104A, 104B and the execution process of stages 402-408 may be performed again.

In the parallelization paradigm illustrated by the example of FIG. 4, execution of two applications is parallelized by programming of a photonic network to dynamically configure which processors can access memory units through the photonic network. As a result, input and output data for each application being executed by a respective processor resides within a single memory location (e.g., one or more memory units). Unlike in conventional parallelization paradigms, the act of copying and transferring of data between memory locations may be omitted. Thus, there is no communication needed between memory units. Further, no memory needs to be allocated for data copying. Rather, both of the memory units are used for the execution of the applications. Moreover, coherency is automatically maintained in the parallelization paradigm because there is only a single copy of each input and result of application(s) executed using the input.

In some embodiments, a processor may perform operation(s) in parallel with a memory controller. For example, the processor 100A stores the results of its first computation process in memory unit 104A and processor 100B stores its first results in memory unit 104B. The processors 100A and 100B then proceed to their second computation process, e.g., for a different program or a different set of data. At the same time, the memory units 104A and 104B may perform a gather, a scatter, or a reduce operation without the involvement of processors 100A and 100B. For example, all-reduce operations are required between the computed gradients in a deep learning training process. Processors 100A and 100B can then fetch the results of the gathered/scattered/reduced data from memory units 104A and 104B, respectively.

Figure 5:
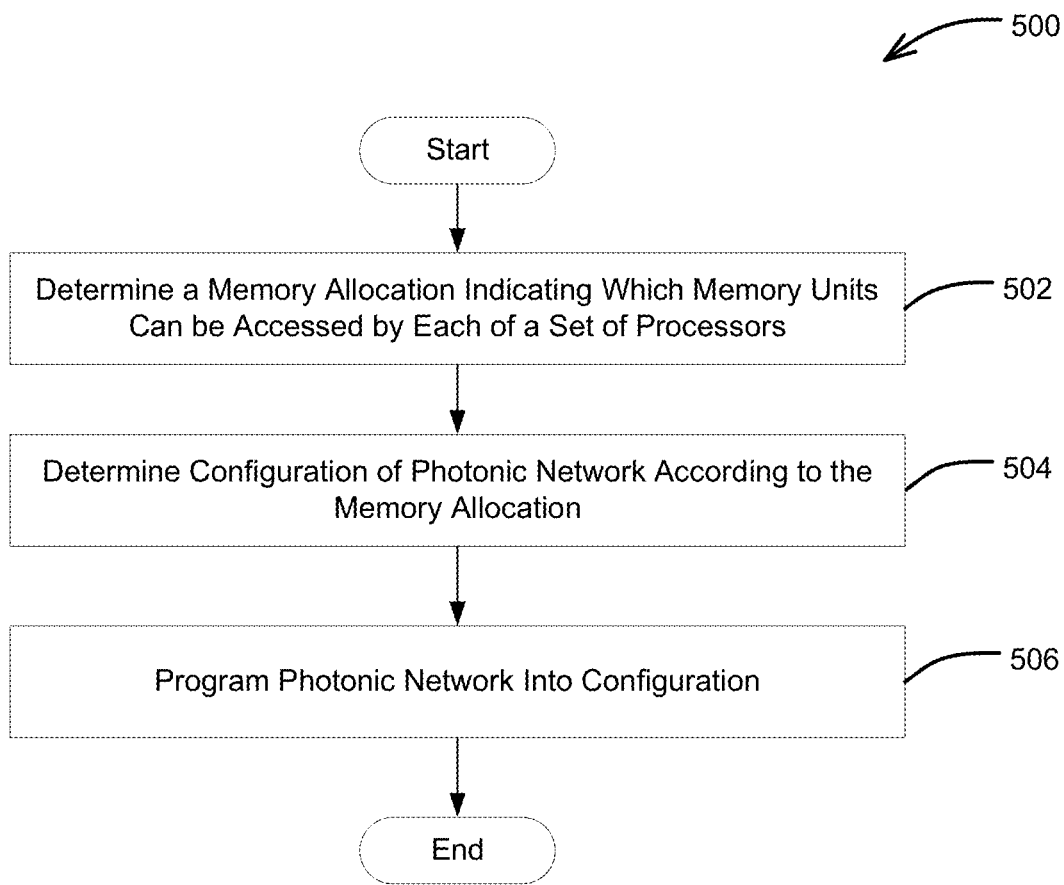
FIG. 5 is an example process for programming a photonic network, according to some embodiments of the technology described herein.

FIG. 5 is an example process 500 for programming a photonic network, according to some embodiments of the technology described herein. In some embodiments, the process 500 may be performed using a programmable photonic network that controls which of a set of one or more processors can access memory units of memory separate from the processor(s). For example, process 500 may be performed by the photonic computing system described herein with reference to FIGS. 1A-1C.

Process 500 begins at block 502, where the system determines a memory allocation indicating which memory units can be accessed by each of the set of processor(s). In some embodiments, the system may be configured to determine a memory allocation for virtual CPUs (e.g., virtual machines as described herein with reference to FIGS. 5A-5B.). In some embodiments, the system may be configured to determine a memory allocation based on the requirements of one or more processes (e.g., software application(s)) to be executed by the system. In some embodiments, the system may be configured to determine a memory allocation for a stage of a parallelized execution of a process (e.g., as described herein with reference to FIG. 4). As an illustrative example, the system may determine a memory allocation that indicates, for each of a set of processor(s), which memory units can be accessed by the processor.

Next, process 500 proceeds to block 504, where the system determines a configuration of the photonic network based on the memory allocation. In some embodiments, the photonic network may comprise an optical circuit including one or more configurable optical switches. The system may be configured to determine a configuration of the photonic network by determining a configuration of the one or more optical switches according to the memory allocation. The configuration of the one or more optical switches may configure the photonic network such that each of the set of processor(s) would have access to memory unit(s) indicated by the memory allocation.

Next, process 500 proceeds to block 506, where the system programs the photonic network into the determined configuration. In some embodiments, the system may be configured to program the photonic network into the configuration by configuring the one or more optical switches of the photonic network. The system may be configured to configure the one or more optical switches such that an optical circuit of the photonic network enables communication between each of the set of processor(s) and its allocated memory unit(s). For example, the configuration may allow the set of processor(s) to read data from and write data into respective allocated memory unit(s).

Figure 6:
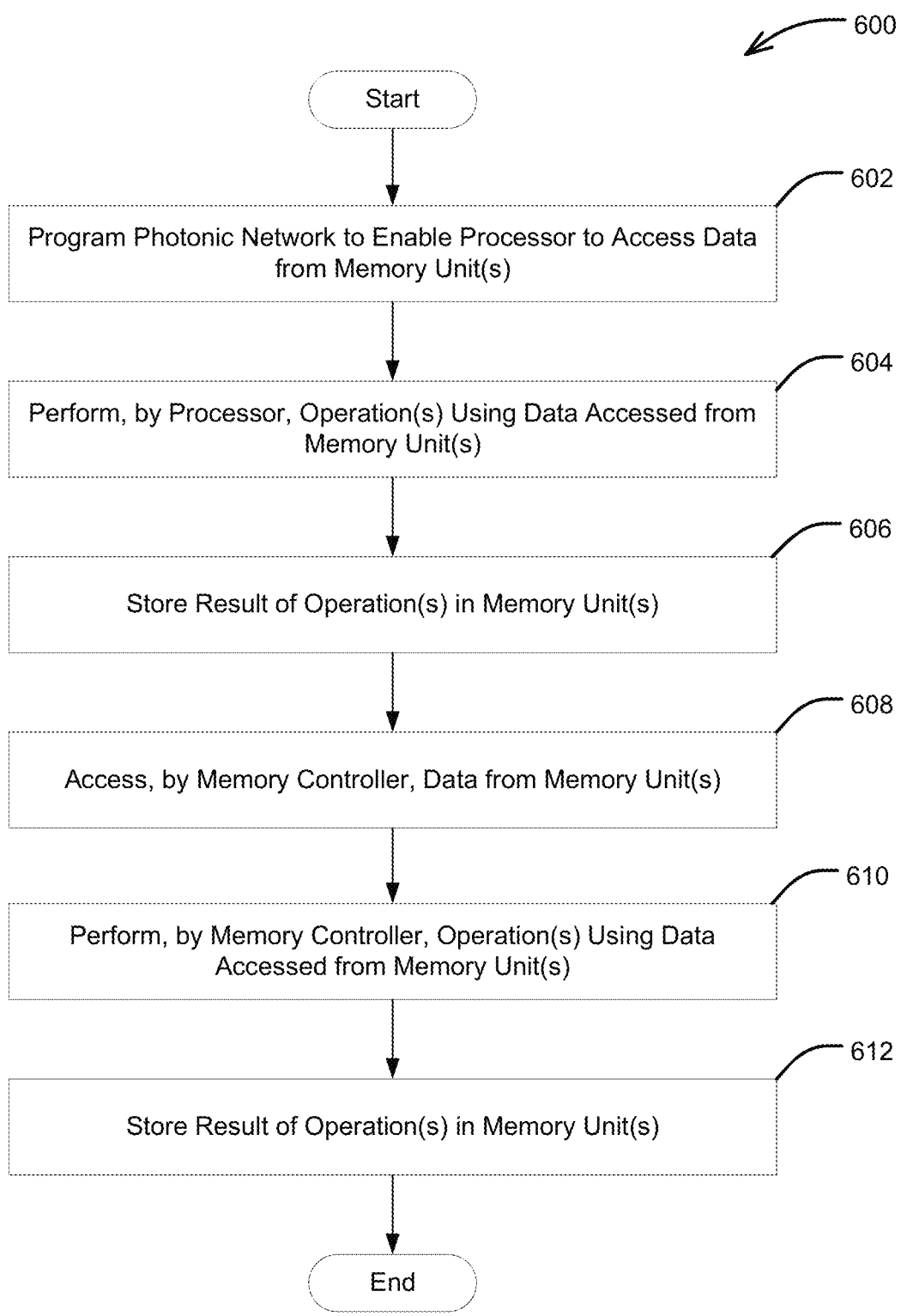
FIG. 6 is an example process for performing operations using a processor separate from a photonic network and a memory controller of the photonic network, according to some embodiments of the technology described herein.

FIG. 6 is an example process 600 for performing operations using a processor separate from a photonic network and a memory controller of the photonic network, according to some embodiments of the technology described herein. Process 600 may be performed by a processor and a memory controller integrated with memory units (e.g., on photonic substrate). In some embodiments, process 600 may be performed by the photonic computing system described herein with reference to FIGS. 1A-1C. For example, process 600 may be performed by processor 100A and memory controller 106A of photonic substrate 102.

Process 600 begins at block 602, where the system programs the photonic network to enable a processor of the photonic computing system (e.g., processor 100A) to access one or more memory units. Example techniques for programming a photonic network are described herein with reference to FIG. 5.

Next, process 600 proceeds to block 604, where the processor performs one or more operations using data from the memory unit(s) it can access through the photonic network. The processor may access the data from the memory unit(s) (e.g., by transmitting a read data signal) and use the data to perform operation(s). Next, process 600 proceeds to block 606, where the processor stores a result of the operation(s) in the memory unit(s).

Next, process 600 proceeds to block 608, where the memory controller accesses data from one or more memory units. Next, process 600 proceeds to block 610, where the memory controller performs operation(s) using data accessed from the memory unit(s). In some embodiments, the data accessed from the memory unit(s) may be the result of the operation stored at block 606. In some embodiments, the data may be other data stored in the memory unit(s). In some embodiments, the memory controller may perform the operation(s) in response to a command from the processor. In some embodiments, the memory controller may perform the operation(s) in response to receiving data from the processor. In some embodiments, the memory controller may perform the operation(s) in response to a command from an external CPU.

In some embodiments, the memory controller may perform the operation(s) in parallel with performance of operation(s) by the processor. For example, the processor may process subsequent data while the memory controller perform operation(s) using the result of the operation(s) stored at block 606. As another example, the memory controller may access other data from memory unit(s) and perform operation(s) while the processor performs operation(s). In some embodiments, the memory controller may perform operation(s) after performance of operation(s) by the processor.

In some embodiments, the set of operation(s) performed by the memory controller may be different from the set of operation(s) performed by the processor. The set of operation(s) performed by the processor may include one or more operations that are not included in the set of operation(s) performed by the memory controller. In some embodiments, none of the of set of operation(s) performed by the processor at block 604 may be performed by the memory controller.

In some embodiments, the memory controller may perform a set of operation(s) that have lower complexity than those performed by the processor at block 604. For example, process 600 may be performed to implement a technique for training a machine learning model (e.g., a neural network). At block 610, the memory controller may perform a set of operation(s) as part of performing the training that are less computationally complex than those performed by the processor. To illustrate, the training technique may be a stochastic gradient descent technique where the processor may determine a gradient (e.g., by performing matrix multiplication operations) and the memory controller may update parameters of the machine learning model using the gradient (e.g., by performing addition operations). In another case, the memory controller and the memory units may perform the collective all-reduce (or averaging) operations, for example, when the gradients calculated from different batches/mini-batches are stored in different memory units. The collective operations can be performed independently of and in parallel with the processors such that it frees the processors to perform other compute-intensive operations.

Next, process 600 proceeds to block 612, where the memory controller stores results of its performed operation(s) in memory unit(s). The memory controller may store the results in one or more of a set of memory units that the memory controller is integrated with.

Figure 7:
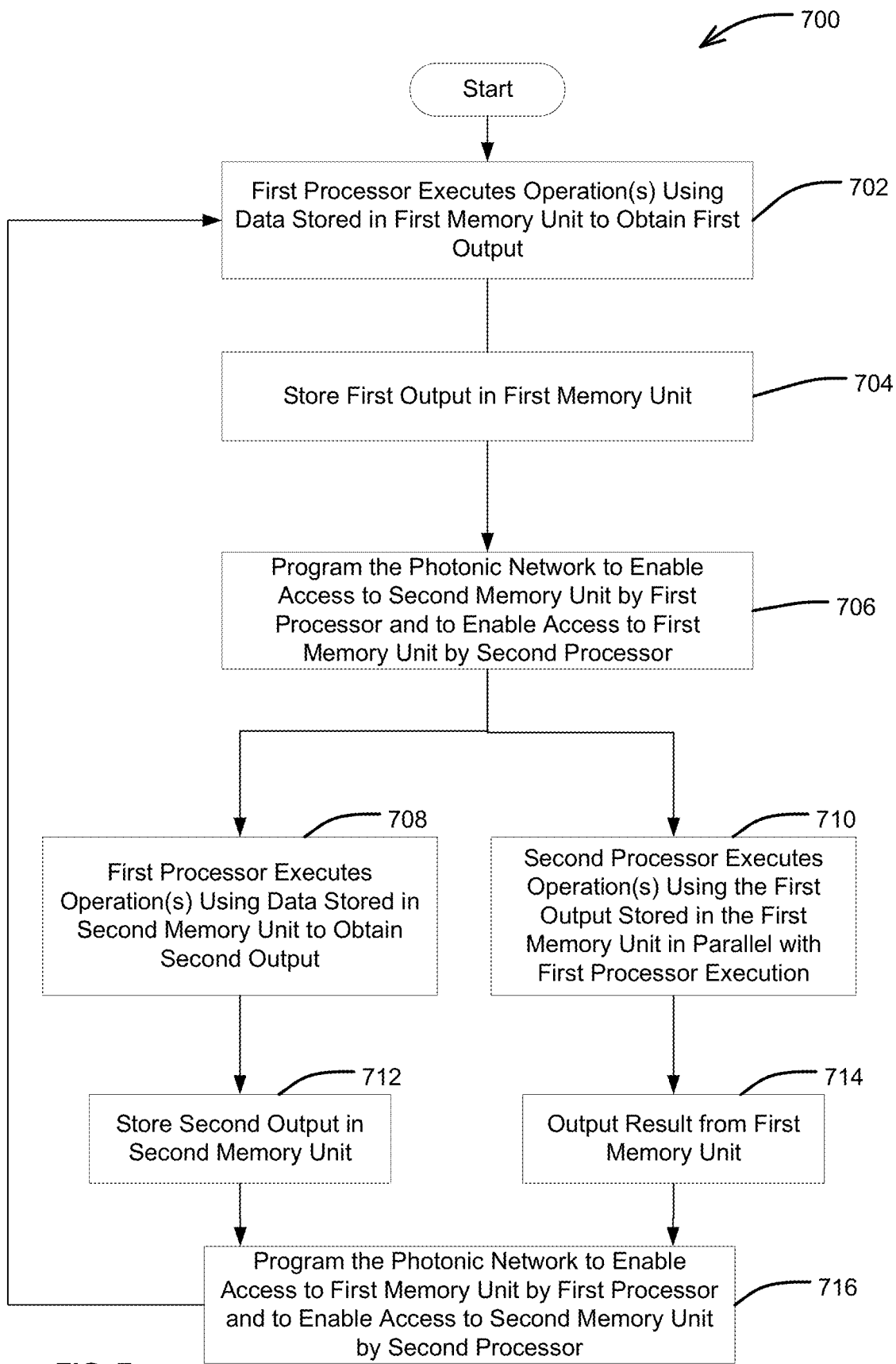
FIG. 7 is an example process for parallelized execution of a software application, according to some embodiments of the technology described herein.

FIG. 7 is an example process 700 for parallelized execution of a software application, according to some embodiments of the technology described herein. In some embodiments, process 700 may be performed by the photonic computing system described herein with reference to FIGS. 1A-1C. In some embodiments, the process 700 may be performed when two processors are each configured to execute a respective application (e.g., one or more operations) to parallelize execution of the software application (e.g., as described herein with reference to FIG. 4).

In some embodiments, prior to performing process 700, input data may be loaded into one or more of the memory units that are to be used in execution of the software application. The one or more memory units may include a first memory unit and a second memory unit. The first memory unit may have data stored therein. For example, an input to be used for execution of the software application may be stored in the first memory unit. In some embodiments, a photonic network of the system may be programmed into a particular configuration prior to execution of the process 700. The photonic network may be programmed such that a first processor has access to the first memory unit and a second processor has access to the second memory unit.

Process 700 begins at block 702, where the first processor executes one or more operations using data stored in the first memory unit to obtain a first output. In some embodiments, the operation(s) may be operation(s) performed in response to executing instructions of a software application program. For example, the first processor may execute one or more functions using one or more numerical values stored in the first memory unit. Next, process 700 proceeds to block 704, where the system stores the first output obtained from executing the operation(s) at block 702 in the first memory unit.

Next, process 700 proceeds to block 706, where the system programs the photonic network to enable access to the second memory unit by the first processor and to enable access to the first memory unit by the second processor. In some embodiments, the system may be configured to program the photonic network as described in process 500 described herein with reference to FIG. 5. For example, the system may configure optical switches of an optical circuit to program the photonic network.

Next, process 700 proceeds to block 708, where the first processor executes operation(s) using the data stored in the second memory unit to obtain a second output. In some embodiments, the first processor may be configured to execute the same operation(s) as it executed at block 702 but using the data that was stored in the second memory unit. For example, the first processor may execute one or more functions using numerical value(s) stored in the second memory unit.

At block 710, the second processor executes operation(s) using the first output stored in the first memory unit in parallel with the execution of the first processor at block 708. In some embodiments, the second processor may be configured to execute another software application using the first output stored in the first memory unit. For example, the output of the operation(s) executed by the first operation are further processed by the second processor to generate a final output.

Next, process 700 proceeds to block 712 where the system stores the second output obtained at block 708 in the second memory unit. At block 714, the system outputs, from the first memory unit, the result of the operation(s) executed by the second processor at block 710. The outputted result may be an output corresponding to an input that was originally stored in the first memory unit.

Next, process 700 proceeds to block 716, where the system programs the photonic network to enable access to the first memory unit by the first processor and to enable access to the second memory unit by the second processor. The process 700 then returns to block 702 where the system processes a subsequent input (e.g., more numerical value(s)). The process 700 may then proceed through blocks 702-716 of process 700.

Figure 8:
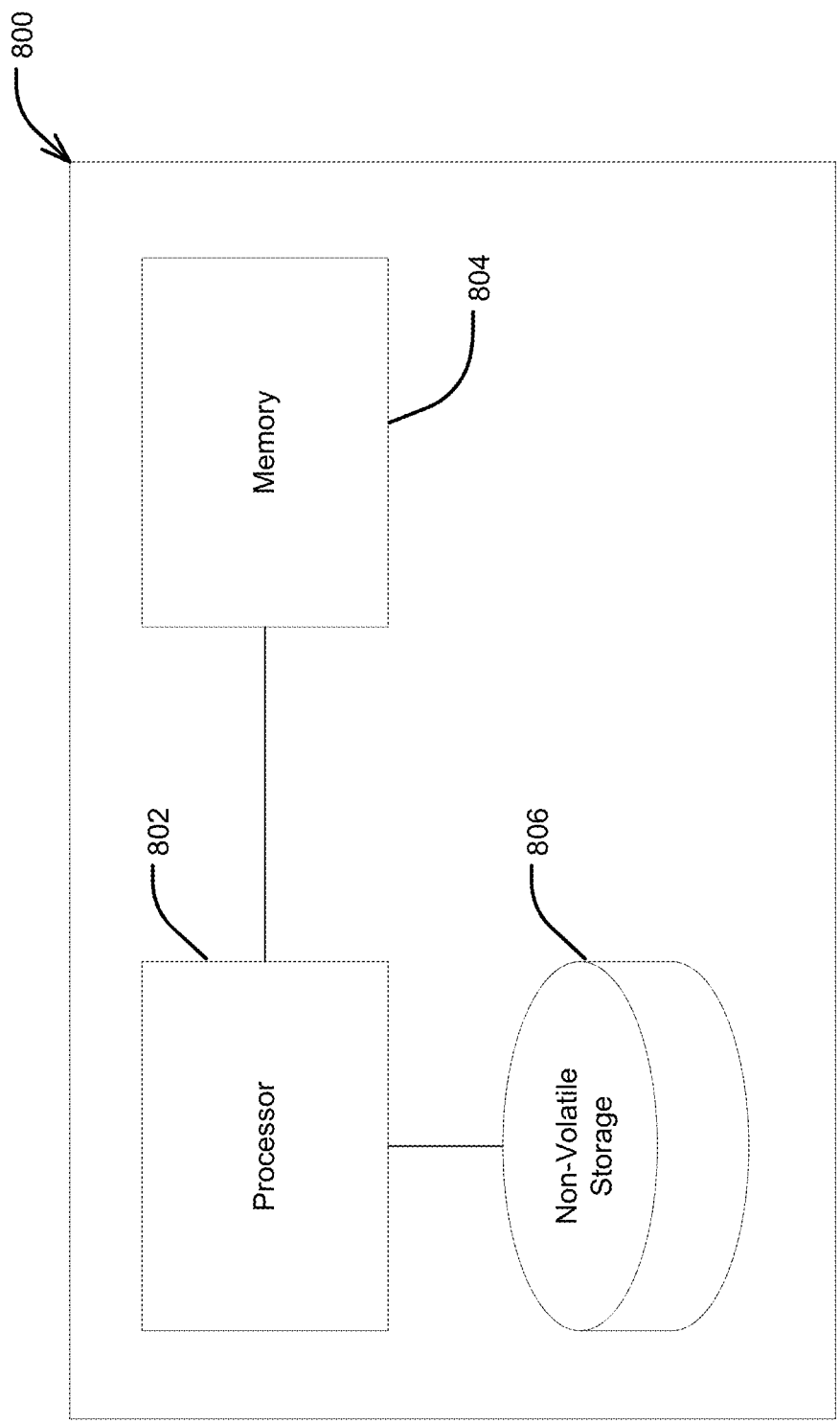
FIG. 8 is a block diagram of an illustrative computing system that may be used in implementing some embodiments of the technology described herein.

FIG. 8 is an example computer system that may be used to implement some embodiments of the technology described herein. The computing device 800 may include one or more computer hardware processors 802 and non-transitory computer-readable storage media (e.g., memory 804 and one or more non-volatile storage devices 806). The processor(s) 802 may control writing data to and reading data from (1) the memory 804; and (2) the non-volatile storage device(s) 806. To perform any of the functionality described herein, the processor(s) 802 may execute one or more processor-executable instructions stored in one or more non-transitory computer-readable storage media (e.g., the memory 804), which may serve as non-transitory computer-readable storage media storing processor-executable instructions for execution by the processor(s) 802.

The terms "program" or "software" are used herein in a generic sense to refer to any type of computer code or set of processor-executable instructions that can be employed to program a computer or other processor (physical or virtual) to implement various aspects of embodiments as discussed above. Additionally, according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform tasks or implement abstract data types. Typically, the functionality of the program modules may be combined or distributed.

Various inventive concepts may be embodied as one or more processes, of which examples have been provided. The acts performed as part of each process may be ordered in any suitable way. Thus, embodiments may be constructed in which acts are performed in an order different than illustrated, which may include performing some acts simultaneously, even though shown as sequential acts in illustrative embodiments.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A photonic computing system comprising:
   a first processor;
   an optical channel; and
   a photonic substrate separate from the first processor, the photonic substrate comprising:
      a plurality of memory units storing data;
      a memory controller; and
      a photonic network for providing access to the plurality of memory units through the optical channel;
   wherein:
      the photonic network is programmable to configure which of the plurality of memory units the first processor can access through the optical channel;
      the first processor is configured to perform a first set of one or more operations using data from the plurality of memory units; and
      the memory controller is configured to perform a second set of one or more operations using data from the plurality of memory units.

2. The photonic computing system of claim 1, wherein the first set of one or more operations includes at least one operation that is not included in the second set of one or more operations.

3. The photonic computing system of claim 2, wherein none of the first set of one or more operations are included in the second set of one or more operations.

4. The photonic computing system of claim 1, wherein performing the first set of one or more operations by the first processor is in parallel with performance of the second set of one or more operations by the memory controller.

5. The photonic computing system of claim 1, wherein performing the second set of one or more operations by the memory controller is subsequent to performance of the first set of one or more operations by the first processor.

6. The photonic computing system of claim 5, wherein performing the second set of one or more operations by the memory controller comprises using a result of the first set of one or more operations stored in the plurality of memory units to perform the second set of one or more operations.

7. The photonic computing system of claim 1, further comprising a second processor configured to perform a third set of one or more operations using data from the plurality of memory units, wherein execution of the third set of one or more operations by the second processor is in parallel with execution of the first set of one or more operations by the first processor.

8. The photonic computing system of claim 1, wherein:
performing the second set of one or more operations by the memory controller comprises:
accessing data stored in a first one of the plurality of memory units by the first processor; and
performing the second set of one or more operations using the data accessed from the first memory unit.

9. The photonic computing system of claim 1, wherein the first set of one or more operations is more computationally complex than the second set of one or more operations.

10. The photonic computing system of claim 1, wherein the first set of one or more operations comprises a matrix multiplication.

11. The photonic computing system of claim 1, wherein the second set of one or more operations comprises computing an average of values stored in the plurality of memory units.

12. The photonic computing system of claim 1, wherein the second set of one or more operations comprises a gather, scatter, and/or reduce operation.

13. A method performed using a photonic computing system comprising a first processor, a photonic substrate separate from the first processor, the photonic substrate comprising a plurality of memory units, a memory controller, and a photonic network for providing access to the plurality of memory units, the method comprising:
programming the photonic network to provide the first processor with access to one or more of the plurality of memory units;
performing, using the first processor, a first set of one or more operations using data from the plurality of memory units; and
performing, using the memory controller, a second set of one or more operations using data from the plurality of memory units.

14. The method of claim 13, wherein the first set of one or more operations includes at least one operation that is not included in the second set of one or more operations.

15. The method of claim 13, wherein performing the first set of one or more operations by the first processor is in parallel with performance of the second set of one or more operations by the memory controller.

16. The method of claim 13, wherein performing the second set of one or more operations by the memory controller is subsequent to performance of the first set of one or more operations by the first processor.

17. The method of claim 16, wherein performing the second set of one or more operations by the memory controller comprises using a result of the first set of one or more operations stored in the plurality of memory units to perform the second set of one or more operations.

18. The method of claim 13, wherein:
performing the second set of one or more operations by the memory controller comprises:
accessing data stored in a first one of the plurality of memory units by the first processor; and
performing the second set of one or more operations using the data accessed from the first memory unit.

19. The method of claim 13, wherein the first set of one or more operations is more computationally complex than the second set of one or more operations.

20. A non-transitory computer-readable storage medium storing instructions that, when executed using a photonic computing system comprising a first processor, a photonic substrate separate from the first processor, the photonic substrate comprising a plurality of memory units, a memory controller, and a photonic network for providing access to the plurality of memory units, causes the photonic computing system to perform a method comprising:
programming the photonic network to provide the first processor with access to one or more of the plurality of memory units;
performing, using the first processor, a first set of one or more operations using data from the plurality of memory units; and
performing, using the memory controller, a second set of one or more operations using data from the plurality of memory units.

* * * * *